United States Patent [19]

Jung

[11] Patent Number: 5,596,370
[45] Date of Patent: Jan. 21, 1997

[54] BOUNDARY MATCHING MOTION ESTIMATION APPARATUS

[75] Inventor: Hae-Mook Jung, Seoul, Rep. of Korea

[73] Assignee: Daewoo Electronics Co., Ltd., Seoul, Rep. of Korea

[21] Appl. No.: 381,797

[22] Filed: Feb. 1, 1995

[51] Int. Cl.$^6$ .................................................. H04N 7/32
[52] U.S. Cl. .......................................... 348/416; 348/699
[58] Field of Search ........................... 348/699, 700, 348/416, 413, 402, 390, 384

[56] References Cited

U.S. PATENT DOCUMENTS

| | | | |
|---|---|---|---|
| 5,036,393 | 7/1991 | Samad et al. | 348/699 |
| 5,200,820 | 4/1993 | Gharavi | 348/416 |
| 5,327,232 | 7/1994 | Kim | 348/412 |
| 5,347,311 | 9/1994 | Golin | 348/416 |
| 5,453,801 | 9/1995 | Kim | 348/699 |
| 5,481,627 | 1/1996 | Kim | 382/254 |

OTHER PUBLICATIONS

C. H. Hsieh et al., "Motion Estimation Algorithm Using Interblock Correlation", Electronics Letters, vol. 26, No. 5, pp. 276–277, Mar. 1990.

J. R. Jain et al., "Displacement Measurement and Its Application in Interframe Image Coding", IEEE Transactions on Communications, COM–29, No. 12, Dec. 1981.

Primary Examiner—Tommy P. Chin
Assistant Examiner—Bryan S. Tung
Attorney, Agent, or Firm—Anderson, Kill & Olick P.C.

[57] ABSTRACT

An apparatus for determining a motion vector representing a displacement between a current frame and a previous frame of video signals comprises an error detector for comparing the error functions calculated from block matching sections to each other and selecting M number error functions in the order of their magnitude beginning from a smallest, a displacement vector selector for selecting M number of displacement vectors from displacement vectors generated from candidate block formation sections, a candidate block selector for selecting M number of candidate blocks, M number of boundary matching sections for generating M sets of boundary differences, M number of comparison and counting sections for comparing boundary differences in one of the M sets of boundary differences with a predetermined value, to count the number of the boundary differences having a value larger than the predetermined value; and an optimum motion vector selector for selecting a counted number having a minimum value to determine one of said M number of displacement vectors which corresponds to the selected counted number, as the motion vector for the search block.

1 Claim, 3 Drawing Sheets

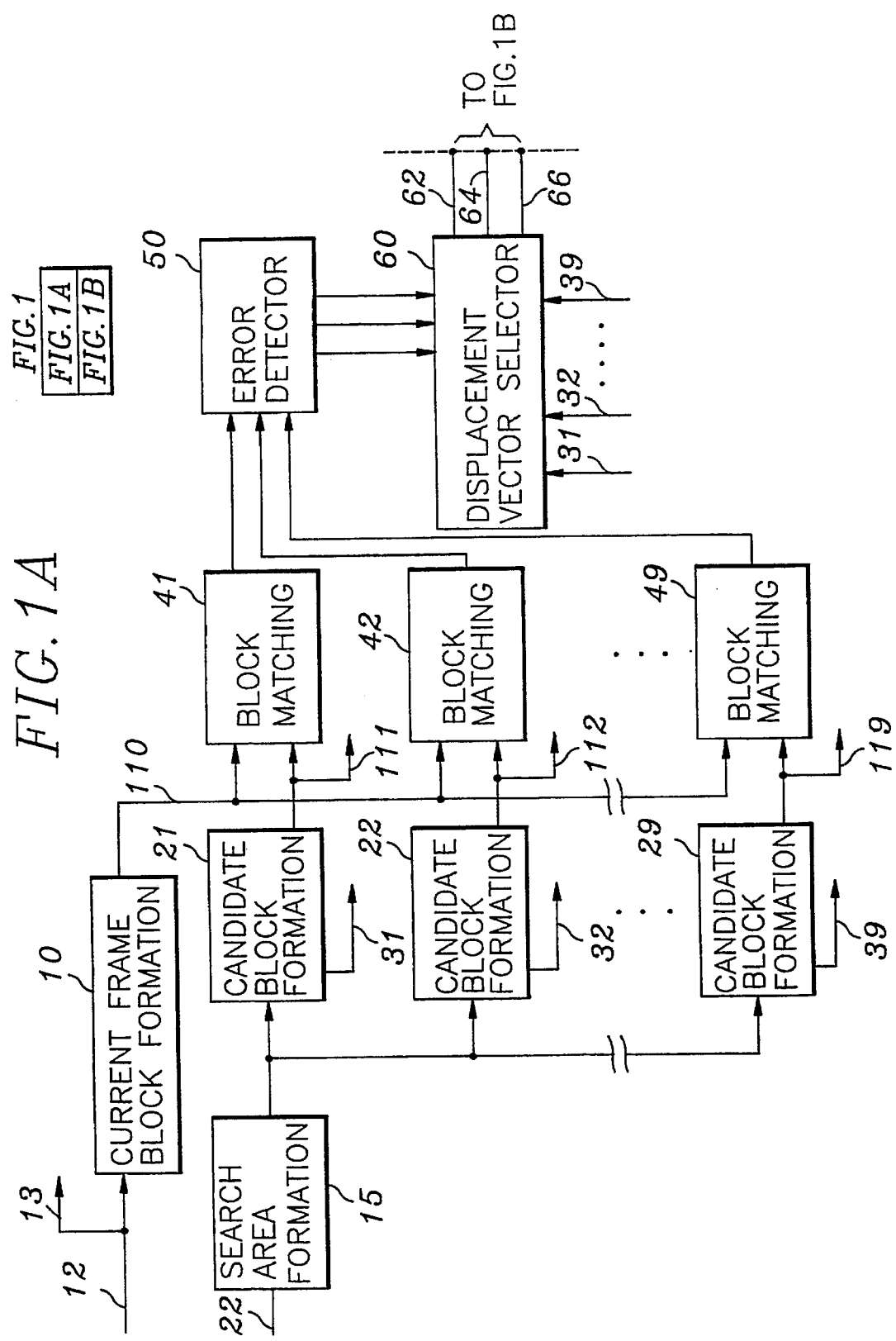

BOUNDARY MATCHING MOTION ESTIMATION APPARATUS

FIELD OF THE INVENTION

The present invention relates to an apparatus for determining motion vectors; and, more particularly, to an improved motion estimation apparatus for determining motion vectors by using a boundary matching technique.

DESCRIPTION OF THE PRIOR ART

In various electronic/electrical applications such as high definition television and video telephone systems, an image signal may need be transmitted in a digitized form. When the image signal is expressed in a digitized form, there is bound to occur a substantial amount of digital data. Since, however, the available frequency bandwidth of a conventional transmission channel is limited, in order to transmit the image signal therethrough, it is inevitable to compress or reduce the volume of the transmission data. Among various video compression techniques, a motion compensated interframe coding technique, which utilizes temporal redundancies of the video signals between two adjacent video frames for the compression of the signals, is known to be one of the more effective compression techniques.

In the motion compensated interframe coding scheme, current frame data is predicted from previous frame data based on an estimation of a motion between the current and the previous frames. Such estimated motion may be described in terms of two dimensional motion vectors representing the displacement of pixels between the previous and the current frames. One of the motion vector estimation schemes which have been proposed in the art is a block matching algorithm (see, e.g., J. R. Jain et al., "Displacement Measurement and Its Application in Interframe Image Coding", *IEEE Transactions on Communications COM*-29, No. 12 (December 1981)).

According to the block matching algorithm, a current frame is divided into a plurality of equal-sized search blocks. The size of a search block typically ranges between 8×8 and 32×32 pixels. To determine a motion vector for a search block in the current frame, a similarity calculation is performed between the search block of the current frame and each of a multiplicity of equal-sized candidate blocks included in a generally larger search region within a previous frame. An error function such as the mean absolute error or mean square error is used to carry out a similarity measurement between the search block of the current frame and each of the candidate blocks in the search region. And a motion vector, by definition, represents the displacement between the search block and a best matching block, i.e., a candidate block which yields a minimum "error" or difference.

In this motion estimation, it would be desirable or convenient to find out only one minimum mean absolute error over the entire search region corresponding to a given search block. Sometimes, however, there may be a plurality of equivalent minimum differences found during the block matching. In this case, the MPEG (Moving Pictures Expert Group) has suggested that all of the other equivalent minimum differences, except the minimum difference that has the highest priority among them, i.e., the one found first, are dropped out although this is not a matter of standardization. As a result, it is difficult to correctly detect a motion vector with such scheme between the search block and the corresponding search region.

SUMMARY OF THE INVENTION

It is, therefore, a primary object of the present invention to provide an improved motion estimation apparatus capable of precisely detecting a motion vector through the use of a boundary matching technique.

In accordance with the present invention, there is provided an apparatus for determining a motion vector representing a displacement between a current frame and a previous frame of video signals, wherein the current frame is divided into a plurality of search blocks of an equal size and the previous frame has a plurality of search regions of a size larger than said equal size of a search block, each search region including a multiplicity of candidate blocks of said equal size, which comprises: means for detecting displacement vectors and error functions between a search block in the current frame and said multiplicity of candidate blocks included in a search region corresponding to the search block; means for comparing the error functions each other and selecting M number of error functions in the order of their magnitude beginning from a smallest, M being an integer larger than 1; means for selecting M number of displacement vectors from said detected displacement vectors, said M number of displacement vectors corresponding to said M number of error functions, respectively; means for selecting M number of candidate blocks from said multiplicity of candidate blocks, said M number of candidate blocks being derived from said selected M number of displacement vectors, respectively; means for generating M sets of boundary differences, wherein each of said M sets of boundary differences represents the differences between the boundary pixels in each of the M candidate blocks and pixels neighboring said boundary pixels and said neighboring pixels are included in the current frame; means having M number of comparison and counting sections, wherein each of the comparison and counting sections compares each boundary difference in one of said M sets of boundary differences with a predetermined value, to count the number of the boundary differences having a value larger than the predetermined value; and means for selecting a counted number having a minimum value to thereby determine one of said M number of displacement vectors which corresponds to the selected counted number, as the motion vector for said search block.

BRIEF DESCRIPTION OF THE DRAWINGS

The above and other objects and features of the present invention will become apparent from the following description of preferred embodiments given in conjunction with the accompanying drawings, in which:

FIG. 1, and FIGS. 1A and 1B, show schematic block diagrams of a boundary matching motion estimation apparatus capable of detecting a motion vector in accordance with the invention.

DETAILED DESCRIPTION OF THE PREFERRED EMBODIMENTS

Figure 1B:
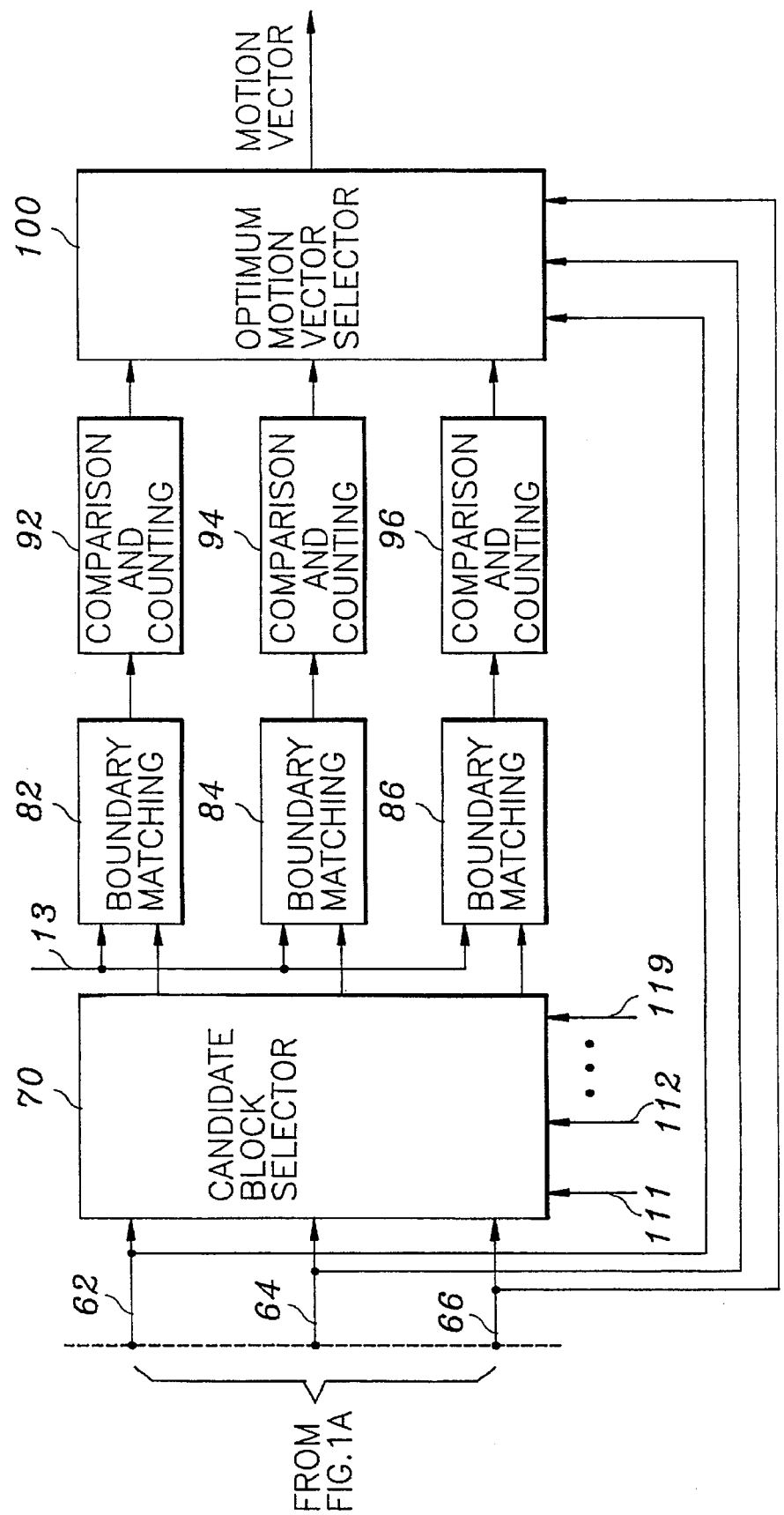

Referring to FIG. 1, there is shown a schematic block diagram of a boundary matching motion estimation apparatus for use in a motion estimation system which is used to achieve a significant data compression by utilizing redundancies between successive frames, i.e., a current frame and its adjacent or previous frame. That is to say, there may be differences between the current frame and the previous frame, which are induced by a displacement or motion of an object; however, such differences may be confined to a relatively small region within a frame. Therefore, it is not necessary to transmit the entire image data of a current frame to a receiver (not shown). Instead, it may suffice to transmit the displacement information, i.e., motion vectors. The receiver then reconstructs the current frame from its previous frame whose image data has been stored in a frame memory within the receiver, utilizing the motion vectors.

As shown in FIG. 1, the current frame signal 12 is applied to a current frame block formation section 10. At the current frame block formation section 10, the current frame is divided into search blocks of a predetermined location and size of P×Q pixels, P and Q being equal integers larger than two, e.g., 4.

The previous frame signal 22 stored in a frame memory (not shown) is applied to a search area formation section 15. The search area formation section 15 defines search regions of the previous frame with an equal size, the size of each search region is generally larger than that of the search block, whereby the search or comparison will be carried out.

After the search region is determined at the search area formation section 15, the search region data is applied to a corresponding number of candidate block formation sections, e.g., 21 to 29. At each candidate block formation section, a candidate block of P×Q pixels is generated from the search region and the relative displacements of the candidate blocks from the location of the search block in the current frame are outputted as displacement vectors, e.g., 31 to 39, of the candidate blocks. All the possible candidate blocks with the size of P×Q pixels are formed within the determined search region, and a displacement vector corresponding to each candidate block is obtained.

The pixel data of each candidate block is also provided from each of the candidate block formation sections 21 to 29 to each of the block matching sections 41 to 49. At each of the block matching sections 41 to 49, an error function is calculated between a search block from the current frame block formation section 10 and candidate blocks from the respective candidate block formation sections 21 to 29. A comparison of, e.g., light intensity or luminance is performed between corresponding pixels in the search block and each of the candidate block to yield an error function for said each of the candidate blocks. The error function will indicate the degree of similarity between the search block and said each candidate block.

All the error functions from the block matching sections 41 to 49 are supplied to an error detector 50. The error detector 50 compares the error functions each other, and selects M number of error functions in the order of their magnitude beginning from a smallest, M being an integer larger than 1, e.g., 3.

Figure 2:
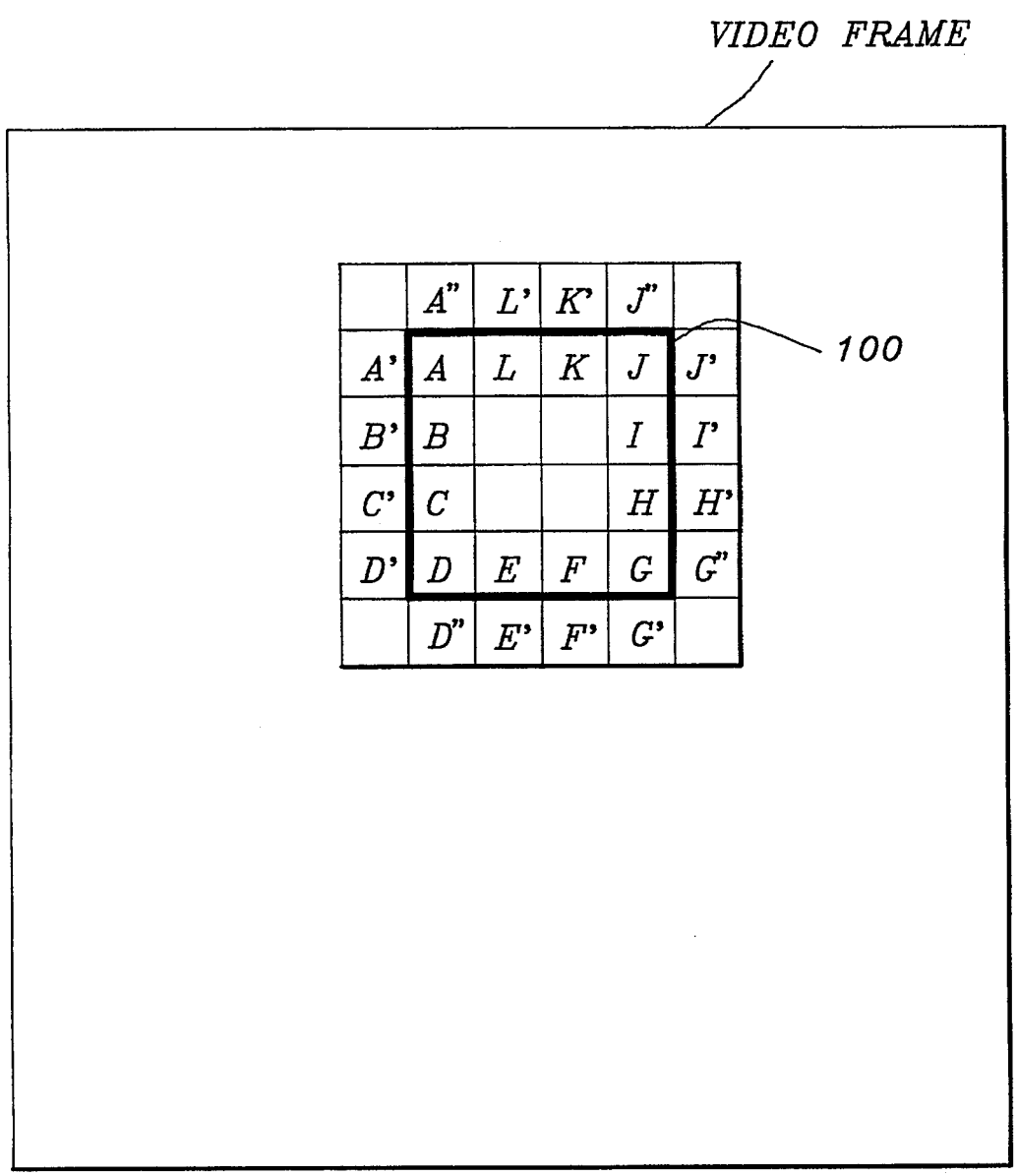
FIG. 2 illustrates an exemplary video frame for explaining a boundary matching operation for a candidate block.

The error detector 50 outputs selection signals which indicate the blocks corresponding to the first, the second and the third smallest error functions to a displacement vector selector 60. The displacement vectors 31 to 39 obtained from the candidate block formation sections 21 to 29 are also sent to the displacement vector selector 60. The displacement vector selector 60 then chooses 3 displacement vectors from the set of displacement vectors 31 to 39 supplied thereto, the chosen 3 displacement vectors corresponding to the first, the second and the third smallest error functions, respectively. That is, in response to the selection signals provided from the error detector 50, the displacement vector 60 selects 3 displacement vectors from the displacement vectors 31 to 39. The selected displacement vectors 62, 64 and 66 are then provided to a candidate block selector 70 and an optimum motion vector selector 100 for selecting one of the selected displacement vectors 62, 64 and 66 as a motion vector for the search block. The pixel data 111 to 119 provided from the candidate block formation sections 21 to 29 is also supplied to the candidate block selector 70. At the candidate block selector 70, 3 candidate blocks are selected from all of the candidate blocks included in the search region corresponding to the search block supplied thereto, the selected 3 candidate blocks being derived from the selected displacement vectors 62, 64, and 66. The selected candidate blocks are fed to the boundary matching sections 82, 84, and 86, respectively. The current frame data 13 is also provided to each of the boundary matching sections 82, 84, and 86 for the boundary matching operation thereof. The operation of each boundary matching section 82, 84 and 86 is essentially identical; and, therefor, the operation of the boundary matching section 82 will be representatively described in detail with reference to FIG. 2. In FIG. 2, an exemplary video frame is illustrated in order to describe the boundary matching operation between the boundary pixels of the candidate block and the pixels neighboring the boundary pixels, said neighboring pixels being included in the current frame.

In a preferred embodiment of the present invention, the boundary matching section 82 removes the search block from the current frame and positions the candidate block yielding the smallest error function into the location of the removed search block; and then calculates boundary differences between the boundary pixels, e.g., A to L of the candidate block 100 and the pixels, e.g., A' to A", neighboring the boundary pixels of the candidate block 100 placed at the location of the removed search block within the current frame, thereby generating absolute values of the boundary differences to a comparison and counting section 92. In other words, absolute values of the boundary differences, e.g., A–A' to A–A", are supplied to the comparison and counting section 92. The comparison and counting section compares the absolute values with a predetermined value; and counts the number of the boundary differences having a value larger than the predetermined value, thereby providing the counted value to the optimum motion vector detector 100. Similarly, boundary matching sections 84, 86 perform the same operation for the candidate blocks yielding the second and the third smallest error functions as the boundary matching section 82. Also, comparison and counting sections 94, 96 perform the same operation as the comparison and counting section 92. The optimum motion vector detector 100 selects a counted number having a minimum value to determine one of the 3 displacement vectors 62, 64, 66 which corresponds to the selected minimum counted umber, as the motion vector for the search block.

While the present invention has been shown and described with reference to the particular embodiments, it will be apparent to those skilled in the art that many changes and modifications may be made without departing from the spirit and scope of the invention as defined in the appended claim.

What is claimed is:

1. An apparatus for determining a motion vector representing a displacement between a current frame and a previous frame of video signals, wherein the current frame is divided into a plurality of search blocks of an equal size and the previous frame has a plurality of search regions of a size larger than said equal size of a search block, each search region including a multiplicity of candidate blocks of said equal size, which comprises:

means for detecting displacement vectors and error functions between a search block in the current frame and said multiplicity of candidate blocks included in a search region corresponding to the search block;

means for comparing the error functions to each other and selecting M number of error functions in the order of their magnitude beginning from the smallest error function, M being an integer larger than 1;

means for selecting M number of respective displacement vectors from said detected displacement vectors, said M number of displacement vectors corresponding to said M number of error functions;

means for selecting M number of respective candidate blocks from said multiplicity of candidate blocks, said M number of candidate blocks being derived from said selected M number of displacement vectors;

means for generating M sets of boundary differences, wherein each of said M sets of boundary differences represents the differences between the boundary pixels, in each of the M candidate blocks, and pixels neighboring said boundary pixels, said neighboring pixels being included in the current frame;

means having M number of comparison and counting sections, wherein each of the comparison and counting sections compares each boundary difference in one of said M sets of boundary differences with a predetermined value, to count the number of the boundary differences having a value larger than the predetermined value; and means for selecting a counted number having a minimum value to thereby determine one of said M number of displacement vectors which corresponds to the selected counted number, as the motion vector for said search block.

* * * * *